(12) United States Patent
Feisthauer

(10) Patent No.: US 7,040,100 B2
(45) Date of Patent: May 9, 2006

(54) LOW-TEMPERATURE DRYER

(75) Inventor: Michael Feisthauer, Meeder (DE)

(73) Assignee: Kaeser Kompressoren GmbH, Coburg (DE)

( * ) Notice: Subject to any disclaimer, the term of this patent is extended or adjusted under 35 U.S.C. 154(b) by 45 days.

(21) Appl. No.: 10/742,277

(22) Filed: Dec. 19, 2003

(65) Prior Publication Data

US 2004/0206095 A1    Oct. 21, 2004

(30) Foreign Application Priority Data

Dec. 24, 2002 (DE) .............................. 102 61 922

(51) Int. Cl.
  *F28D 1/00* (2006.01)
  *F25D 21/00* (2006.01)
  *F25D 17/06* (2006.01)
(52) U.S. Cl. .............................. 62/63; 62/272; 165/155
(58) Field of Classification Search .................... 62/93, 62/95, 272; 165/155, 47, 173, 176, 113, 165/141
  See application file for complete search history.

(56) References Cited

U.S. PATENT DOCUMENTS

| 3,861,165 A | 1/1975 | Hirano ........................... 62/93 |
| 4,638,852 A * | 1/1987 | Basseen et al. ............... 165/47 |
| 4,646,819 A | 3/1987 | Pridham ..................... 165/111 |
| 5,228,504 A | 7/1993 | Mantegazza et al. ....... 165/111 |
| 5,275,233 A * | 1/1994 | Little ......................... 165/111 |

FOREIGN PATENT DOCUMENTS

| DE | 19949476 | 10/1999 |
| DE | 10030627 | 6/2000 |
| EP | 0138677 | 9/1984 |
| EP | 0582835 | 7/1993 |
| GB | 208687 | 5/1928 |
| JP | 04270894 | 9/1992 |
| JP | 05039990 A * | 2/1993 |
| WO | WO 94/10520 | 5/1994 |

* cited by examiner

*Primary Examiner*—Chen Wen Jiang
(74) *Attorney, Agent, or Firm*—Baker Botts L.L.P.

(57) ABSTRACT

A low-temperature dryer, especially a compressed air low-temperature dryer, for drying of a gaseous working fluid with cooling of the gaseous working fluid by use of a refrigerant comprises a pre-heat exchanger section (11) and a main heat exchanger section (12), in which the pre-heat exchanger section (11) and/or the main heat exchanger section (12) comprises at least one, preferably elongated heat exchanger element. Cooling of the working fluid introduced to the low-temperature dryer occurs here in the pre-heat exchanger section (11) from the dried and cooled working fluid. Additional cooling of the precooled working fluid passed through the low-temperature dryer occurs in the main heat exchanger section (12) from the refrigerant, so that moisture is condensed from the working fluid. All flow channels (21, 22) of the pre-heat exchanger section (11) and/or the main heat exchanger section (12) are formed essentially by hollow chamber profiles.

28 Claims, 11 Drawing Sheets

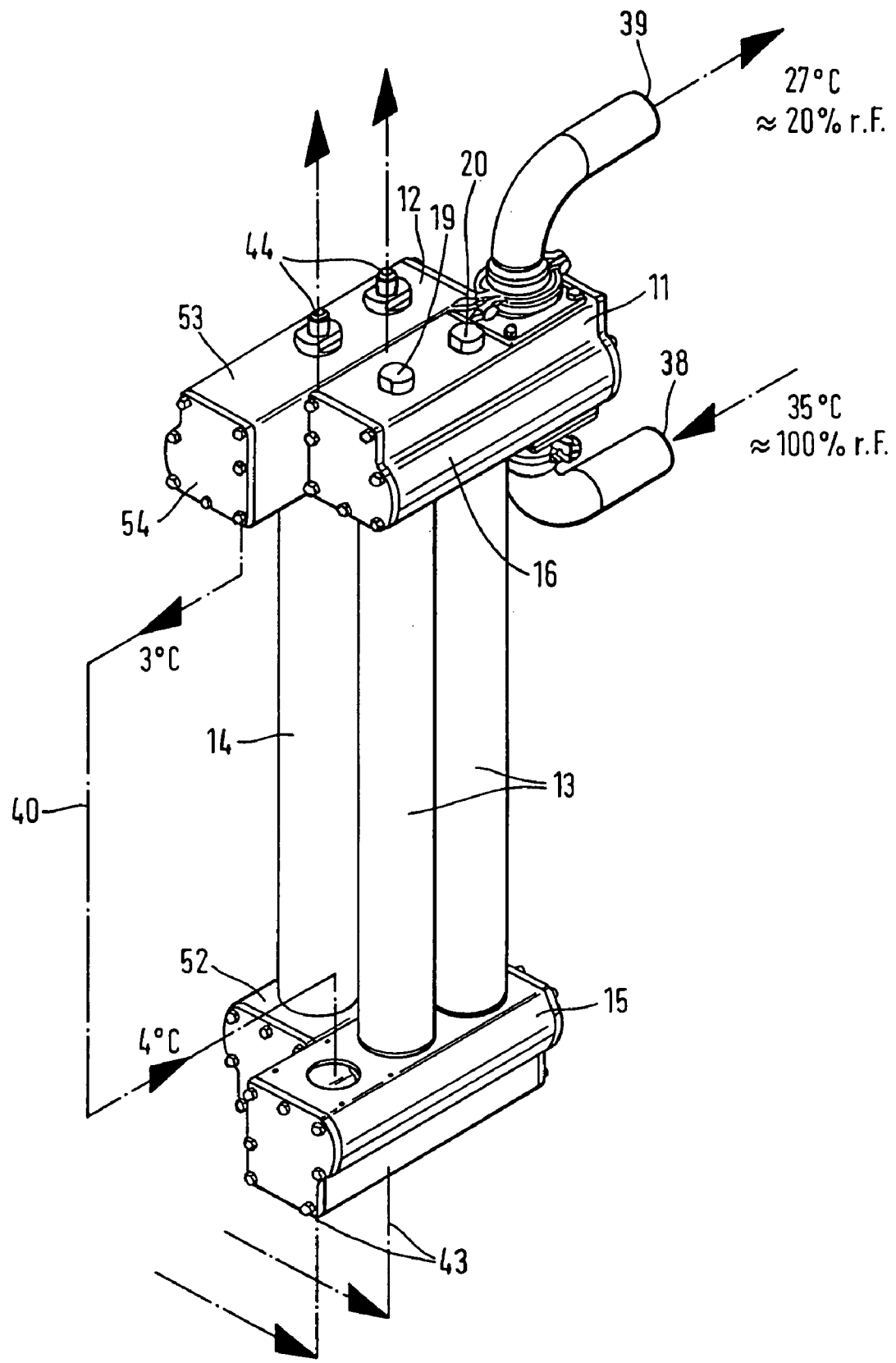

LOW-TEMPERATURE DRYER

PRIORITY

This application claims priority to German patent application number 102 61 922.0 filed Dec. 24, 2002.

FIELD OF THE INVENTION

The invention concerns a low-temperature dryer, especially a compressed air low-temperature dryer, for drying of a gaseous working fluid during cooling of a gaseous working fluid by using a refrigerant.

BACKGROUND OF THE INVENTION

In low-temperature dryers, especially compressed air low-temperature dryers, for drying of a gaseous working fluid during cooling of a gaseous working fluid using a refrigerant, the working fluid initially passes through a pre-heat exchanger section and then a main heat exchanger section. Cooling of the working fluid fed to the low-temperature dryer occurs in the pre-heat exchanger section by the dried and cooled working fluid in the countercurrent principle. The working fluid is further cooled by a refrigerant in the main heat exchanger section, so that moisture is condensed out from the working fluid and can be withdrawn.

A low-temperature dryer according to the prior art is described, for example, in DE 100 30 627 A1.

SUMMARY OF THE INVENTION

The underlying task of the invention is to offer a low-temperature dryer that has improved design, especially guaranteeing effective heat exchange with a compact design. At the same time, heat exchanger elements are to be offered that achieve such effective heat exchange.

This task is solved with a low-temperature dryer, especially compressed air low-temperature dryer, for drying of a gaseous working fluid with cooling of a gaseous working fluid by use of a refrigerant, comprising a pre-heat exchanger section and a main heat exchanger section, in which the pre-heat exchanger section and/or the main heat exchanger section comprises at least a preferably elongated heat exchanger element, in which cooling of the working fluid sent to the low-temperature dryer occurs in the pre-heat exchanger section from the dried and cooled working fluid in the countercurrent principle, in which additional cooling of the precooled working fluid introduced to the low-temperature dryer occurs in the main heat exchanger section from the refrigerant, so that moisture is condensed from the working fluid, in which all flow channels of the pre-heat exchanger section and/or the main heat exchanger section are designed essentially by hollow chamber profiles with a number of heat guide channels and/or cold guide channels, in which the at least one heat exchanger element of the pre-heat exchanger section and/or the main heat exchanger is secured and connected fluid-tight on the end in a connection profile, in which the heat exchanger element is designed as a preferably elongated tube profile and the heat guide channels and cold guide channels extend along the tube profile, and in which the heat guide channels and the cold guide channels are separated from each other by partitions integrated with the tube profile.

The heat guide channels and the cold guide channels can be adjacent to each other, but arranged in alternation. The heat guide channels and/or the cold guide channels can be opened across the longitudinal extent of the tubular profile on the end by openings, so that inflow or outflow to or from the heat guide channels and/or cold guide channels occurs across the longitudinal extent of the tubular profile. The connection profile can be designed essentially as a hollow chamber profile. The arrangement can be formed from pre-heat exchanger section, main heat exchanger section and from connection profiles provided on the end of a total of at least four hollow chamber profiles. The at least four hollow chamber profiles can be present in the form of two different types that differ in their profile cross sections. The connection profile can be designed in one piece. The connection profile may comprise at least one, preferably at least two, fluid guide chambers that are defined by the hollow chamber profile of the connection profile. The connection profile can be designed for fluid-tight connection of a number of spaced heat exchanger elements. The heat exchanger elements of the pre-heat exchanger section and the main heat exchanger section can be secured and connected fluid-tight in a common connection profile. The tube profile of the heat exchanger elements and/or connection profile can be formed by extrusion. The two connection profiles provided on the ends of the at least one heat exchanger element can be clamped together via rigid bracing elements that are designed, in particular, as rods. The bracing elements, especially rods, can be passed at least partially through the heat exchanger elements. The at least one elongated heat exchanger element can be secured on its ends in the connection profiles, so that the preferred directions of the connection profiles run parallel to each other and the heat exchanger elements are aligned essentially orthogonal to it. The connection profiles can be formed from the same base material as the heat exchanger elements, especially aluminum. The openings of the heat guide channels and/or the openings of the cold guide channels may lie on the tube profile essentially in one plane on the end. The outside walls of the heat guide channels or the cold guide channels can be designed protruding relative to the outside walls of the cold guide channels or the heat guide channels at least on the outside or inside in cross section, and the heat exchanger element may have a circular cross section and the openings in the heat guide channels or cold guide channels arranged protruding in cross section can be introduced by material removal in areas, especially machining. The partitions between heat guide channels and cold guide channels can be provided with profilings, especially ribs, at least on one side, advantageously on both sides, to increase the heat exchanger surface. The heat guide channels and the cold guide channels can be arranged around a central channel that runs along the heat exchanger element. The central channel can be in fluid connection on the end with the heat guide channels or the cold guide channels via openings and can be closed to the center of the tubular profile by a sealing element. The heat exchanger element may have at least one heat guide channel or cold guide channel and, at the same time, at least two, preferably more, cold guide channels or heat guide channels. The heat guide channels and/or the cold guide channels may have an essentially circular segment-like cross section. The partitions may have a curved or bent trend to increase the heat exchanger surface. The partitions may have a spiral arm-like trend in cross section relative to the longitudinal extent of the heat exchanger element. The profile may have a circular cross section and may be designed helical in the axial direction (with a predetermined pitch). The heat exchanger element can be designed as a preferably elongated tubular profile and may comprise several heat guide channels and cold guide channels extending along the tube profile, in which the heat guide channels and the cold guide channels are arranged adjacent to each other, but in alternation, in which the heat guide channels and the cold guide channels are separated from each other by partitions integrated with the tube profile, wherein the outside walls of the heat guide channels or the cold guide channels are designed protruding in cross section relative to the outside walls of the cold guide channels or the heat guide channels at least on the outside or inside. The heat exchanger element can also be designed as a preferably elongated tube profile and may comprise several heat guide channels and cold guide channels extending along the tube profile, in which the heat guide channels and the cold guide channels are arranged adjacent to each other, but in alternation, in which the heat guide channels and the cold guide channels are separated from each other by partitions integrated with the tube profile, wherein the heat guide channels and the cold guide channels are opened on the end across the longitudinal extent of the tube profile by openings, so that inflow or outflow into or from the heat guide channels and cold guide channels occurs across the longitudinal extent of the tube profile, in which the openings of the heat guide channels are also arranged offset relative to openings of the cold guide channels in the longitudinal extent of the tube profile.

A key idea of the present invention is that all flow channels of the pre-heat exchanger section and/or the main heat exchanger section are formed essentially by hollow chamber profiles with a number of heat guide channels and/or cold guide channels, in which the at least one heat exchanger element of the pre-heat exchanger section and/or the main heat exchanger section is secured and connected fluid-tight on the end in a corresponding connection profile, the heat exchanger element preferably being designed as an elongated tubular profile, and the heat guide channels and cold guide channels extending along the tube profile, and in which the heat guide channels and cold guide channels are separated from each other by partitions integrated with the tubular profile. All flow channels of the pre-heat exchanger section and the main heat exchanger section are formed by hollow chamber profiles. These profiles, in another embodiment of the present invention, can also have an identical profile cross section, so that a significant cost reduction is achieved by using identical profile cross sections.

The proposed design also permits particularly compact layout, especially when two or more heat exchanger elements are secured or connected fluid-tight on one end in a common connection profile. This advantage is already present when two or more heat exchanger elements of the pre-heat exchanger section or the main heat exchanger section are secured and connected fluid-tight on the ends in a common connection profile. In an expedient embodiment, the heat guide channels and the cold guide channels are adjacent to each other, but arranged in alternation.

In another particularly preferred embodiment, the heat guide channels and/or the cold guide channels are opened across the longitudinal extent of the tubular profile on the end by openings, so that inflow or outflow to the heat guide channels and/or cold guide channels occurs across the longitudinal extent of the tubular profile. In this embodiment, a simple and expedient connection possibility of the heat guide channels and/or cold guide channels can be implemented.

In a particularly preferred embodiment, all heat exchanger elements of the pre-heat exchanger section and the main heat exchanger section are secured and connected fluid-tight on one end in one or two common connection profiles.

The connection profile is also expediently formed essentially as a hollow chamber profile.

In a specific expedient embodiment, the arrangement is formed from a pre-heat exchanger section, a main heat exchanger section and connection profiles provided on the end from a total of at least four hollow chamber profiles.

A modular design of the overall arrangement is therefore prescribed. This modular layout or design of the pre- or main heat exchanger section offers the possibility of simple capacity adjustment by the length and/or number of exchanger tubes. Connection of the individual components can be conducted without a costly connection process.

In another preferred embodiment, the at least four hollow profiles are present in the form of only two different types that differ in profile cross sections. Because of this, the modular structure can be further simplified, since only two different types of profile cross sections need be provided.

In an advantageous modification of the present invention, the connection profile is performed in one piece, which further reduces manufacturing costs and, at the same time, minimizes connection and tightness problems.

In an advantageous modification, the connection profile comprises at least one, preferably at least two, fluid guide chambers that are defined by the hollow chamber profile of the connection profile. In this embodiment, the connection profile itself can be used to guide the fluid, and specifically the working fluid and/or refrigerant, which, however, is in no way essential. Instead, separate fluid guides, especially in the case of the refrigerant, are conceivable for the main heat exchanger section.

In a particularly preferred embodiment, the connection profile is designed as an extruded profile, especially an aluminum extruded profile. This type of design permits cost-effective and reproducible manufacture.

According to an expedient, but in no way compulsory aspect of the present invention, corresponding connection profiles are provided at both ends of the heat exchanger elements. These connection profiles can be secured to each other via rigid bracing elements according to an additional advantageous aspect of the present invention.

In a specific, simple, but advantageous embodiment, the bracing elements are formed as rods.

According to another aspect of the present invention, the rods can be guided at least partially through the heat exchanger elements. Because of this, a particularly expedient bracing is produced, since the effect on the heat exchanger elements is exerted relatively uniformly.

Naturally, other joining techniques can also be used, instead of the rigid bracing elements, expediently releasable joining techniques.

According to a specific aspect of the present invention, the at least one, preferably elongated, heat exchanger element is positioned in the connection profile on the end, so that the preferred directions of the heat exchanger element and the connection profile run essentially at right angles to each other.

According to another preferred aspect of the present invention, the connection profiles are formed from the same base material as the heat exchanger elements. This also reduces manufacturing costs and eliminates material adjustment problems. In the case of metal as employed material, no voltage potential develops, which might cause problems during use of different materials. An aluminum design is particularly preferred.

Thus, it initially appears as an advantageous embodiment to design the tubular profile as a single piece profile, preferably an aluminum extruded profile. Aluminum is a preferred material, both for operation with gaseous, and especially liquid fluids, which is also easy to machine. In a specific, again extremely preferred embodiment, the heat exchanger element is designed as a single-piece profile. The manufacturing and assembly costs are substantially reduced by the single-piece design. Tightness problems between the individual channels or relative to the outside need hardly be feared at all.

According to another preferred aspect of the present invention, the openings of the heat guide channels and/or the openings of the cold guide channels can lie essentially in one plane on the end of the tubular profile. Accordingly, it can be prescribed that the openings of one group of channels be arranged in essentially one plane. As an alternative or in addition, the openings of the second type of channels can also be arranged in a (different) plane. It is particularly preferred to provide the openings of both types of channels in one plane, in which the openings of one type of channels in this embodiment can be provided on the inside of the tubular profile and the openings of the other type of channels on the outside of the tubular profile.

According to another advantageous aspect of the present invention, the partitions between the heat guide channels and the cold guide channels are provided with profilings, especially ribs, at least on one side, advantageously on both sides to increase the heat exchanger surface. Such ribs or profilings increase the heat transfer and can be formed without significant manufacturing expense, when the tubular profile is designed as an extruded profile.

In another preferred embodiment, the heat guide channels and the cold guide channels are arranged around a central channel running along the heat exchanger element.

In a specific preferred embodiment, the central channel is in fluid connection on the end with the heat guide channels or the cold guide channels via openings and is closed via a sealing element at the center of the tubular profile. The sealing element is supposed to cause the fluid to also flow from the central channel through the provided heat guide channels or cold guide channels and not through the central channel from one end of the heat exchanger element to the other end of the heat exchanger element.

According to another preferred aspect of the present invention, the heat exchanger element has at least two heat guide channels and cold guide channels. The division of the tubular profile into a number of segments appears useful, since, because of this, the wall surfaces and therefore the entire heat exchange rate can be increased.

In a first specific embodiment, the heat guide channels and/or the cold guide channels have a cross section in the form of a circular segment, perpendicular to their longitudinal extent. As an alternative to this, the partitions can have a curved or bent trend between the heat guide channels and/or cold guide channels to increase the heat exchange surface.

In a specific embodiment, the partitions can have a spiral arm-like trend in cross section relative to the longitudinal extent of the heat exchanger element.

In order to create turbulization in the heat guide channels or cold guide channels, which is favorable for the heat exchange rate, and/or to extend the effective length of the heat guide channels or cold guide channels, the profile can be designed helical in the axial direction, i.e., the heat guide channels or cold guide channels wind helically around a central axis.

According to another independent basic idea of the present invention, a heat exchanger element is also proposed for liquid or gaseous media, which can be used, in particular, in a low-temperature dryer according to the invention. The heat exchanger element described here, however, is in no way restricted to the case of a "low-temperature dryer", but can also find application in any other conceivable area of application.

The heat exchanger element according to a first independent aspect of the present invention is designed as a preferably elongated tubular profile and comprises several heat guide channels and cold guide channels extending along the tubular profile. The heat and cold guide channels are adjacent to each other, but arranged in alternation, in which the heat guide channels and cold guide channels are separated from each other by partitions integrated with the tubular profile. A particular feature of this embodiment consists of the fact that the outer walls of the heat guide channels or cold guide channels are designed protruding in cross section at least on the outside or inside relative to the outside walls of the cold guide channels or heat guide channels.

This permits simple and reproducible design of the openings on the protruding heat guide channels or cold guide channels. According to a preferred aspect of the invention, this can occur by material removal, in which machining of the openings in areas can be conducted in a circular design of the cross section of a tubular profile. In another basic form, especially in an essentially flat basic form, this material removal can also be produced by milling or grinding. Openings can also naturally be produced by drilling holes, etc.

According to another independent aspect of the present invention (also independently of the protruding design of the outside walls of the heat guide channels or cold guide channels in cross section), in a heat exchanger element that is preferably designed as an elongated tubular profile and comprises several heat guide channels and cold guide channels extending along the tubular profile, in which the heat guide channels and cold guide channels are adjacent to each other, but arranged in alternation, the heat guide channels and cold guide channels being separated by each other by partitions integrated with the tubular profile, the heat guide channels and the cold guide channels can be opened across the longitudinal extent of the tubular profile on the end by openings, so that inflow or outflow to the heat guide channels and cold guide channels occurs across the longitudinal extent of the tubular profile, and openings of the heat guide channels are also arranged offset relative to the openings of the cold guide channels in the longitudinal extent of the tubular profile. An expedient connection possibility of the heat exchanger element is also offered in this embodiment.

The invention is further explained below with respect to additional features and advantages by means of the description of practical examples and with reference to the accompanying drawings.

BRIEF DESCRIPTION OF THE DRAWINGS

FIG. 2 shows a variant of a pre- and a main heat exchanger section of a low-temperature dryer according to the invention;

DETAILED DESCRIPTION OF THE PREFERRED EMBODIMENTS

Figure 1:
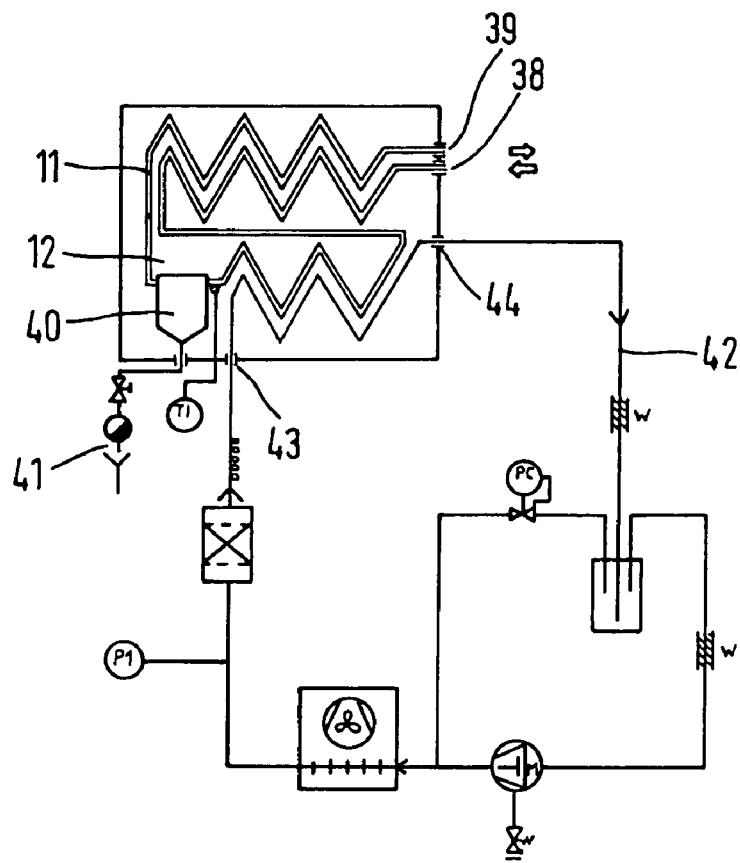
FIG. 1 shows the essential design of a known low-temperature dryer.

FIG. 1 shows the essential layout of a known low-temperature dryer. The low-temperature dryer comprises a pre-heat exchanger section 11 and a main heat exchanger section 12, as well as a condensate separator 40 and a refrigerant loop 42.

The gaseous working fluid is initially passed into the pre-heat exchanger section 11 via a working fluid inlet 38. A first cooling of the working fluid occurs in the pre-heat exchanger section 11 through the already cooled and dried working fluid from the main heat exchanger section 12. The precooled working fluid then enters the main heat exchanger section 12, in which it is further cooled, preferably below the dew point of the entrained moisture, so that the moisture at least partially condenses out in the working fluid. The condensate is separated after leaving the main heat exchanger section 12 at condensate separator 40 and fed to condensate outlet 41. The cooled and dried working fluid enters the pre-heat exchanger section 11, where it is used as refrigerant for the uncooled and moist working fluid. The cooled and dried working fluid is then heated again to a predetermined desired output temperature, and then leaves the low-temperature dryer via a working fluid outlet 39.

Both a liquid and gaseous refrigerant can be used in the main heat exchanger section 12. A refrigerant is fed to the main heat exchanger section 12 via a refrigerant inlet 43, where it cools the precooled working fluid and, in so doing, is simultaneously heated. After leaving the main heat exchanger section 12 via refrigerant outlet 44, the refrigerant is fed into the refrigerant loop 42.

FIG. 2 shows an expedient variant of the pre-heat exchanger section 11 and the main heat exchanger section 12 of a low-temperature dryer according to the invention, which can be otherwise configured according to FIG. 1. The heat exchanger elements 13, 14 (in the present case, elongated) of the pre-heat exchanger section 11 and the main heat exchanger section 12 are secured and connected fluid-tight on both ends in a connection profile 15, 16, 52, 53. Although the heat exchanger elements 13, 14 are designed elongated in the practical examples depicted here, it is also conceivable to make the entire heat exchanger tube spiral-like. The advantage is that a smaller space is produced for the heat exchanger tube. Its functional reliability remains uninfluenced with spiral-like winding. The spiral arrangement of the heat exchanger tubes, however, is already a common practice, so that one skilled in the art can transfer the ideas of the present invention to such a design of heat exchanger tubes. In the present variant, the connection profiles 15, 16, 52, 53 situated on the ends of the heat exchanger elements 13, 14 of the pre-heat exchanger section 11 and the main heat exchanger section 12 are arranged adjacent to each other, parallel and in pairs, to their longitudinal extent. The connection profiles 15, 16, 52, 53 are flattened on the adjacent side. The connection profiles 16 and 53 or 15 and 52 can then be joined to each other, for example, by screwing. Openings (not shown in FIG. 2) in the adjacent side of connection profiles 15 and 52 or 16 and 53, for example, produced by drilling, permit the working fluid to go from the pre-heat exchanger section 11 into the main heat exchanger section 12 and vice versa.

The connection profiles 15, 16, 52, 53 are closed on both ends with end plates 54. The end plates 54 are screwed to the connection profiles 15, 16, 52, 53 and sealed with a seal (not shown in FIG. 2). The connection profiles 15, 16, 52, 53 are secured to each other with rigid bracing elements 19, 20 in the form of rods passed through the heat exchanger elements.

Feed and withdrawal of the uncooled or precooled and the dried working fluid to or from the heat exchanger elements 13 and distribution of the uncooled and dried working fluid to the heat exchanger elements 13 occur via the connection profiles 15, 16 of the pre-heat exchanger section 11.

Feed and withdrawal of the precooled or cooled working fluid to or from the heat exchanger elements 14 and distribution of the precooled working fluid to the heat exchanger elements 14 occur via connection profiles 52, 53 of the main heat exchanger section 12. The refrigerant can also be fed or withdrawn via connection profiles 52, 53 to or from the heat exchanger elements 14. In the present variant, however, the refrigerant is guided directly to the heat exchanger elements 14 via the refrigerant inlet 43 and leaves them directly via the refrigerant outlet 44. The refrigerant inlet 43 and refrigerant outlet 44 can be formed as a channel running at right angles to the longitudinal axis of the connection profiles 52, 53, which leads the refrigerant through the connection profiles 52, 53 to the heat exchanger elements 14.

The working fluid enters at the working fluid inlet 38 with a temperature of, say, 35° C., the pre-heat exchanger section 11 and is guided via the connection profile 16 to the heat exchanger elements 13 arranged and connected in parallel in the present variant. There it is passed by and cooled in countercurrent by the already cooled and dried working fluid. The already cooled and dried working fluid is then heated from 4° C. to 27° C. and leaves the pre-heat exchanger section 11 via connection profile 16 and working fluid outlet 39. The precooled working fluid from the pre-heat exchanger section 11 is now guided into the connection profile 52 via connection profile 15 and from there distributed to the heat exchanger elements 14 of the main heat exchanger section 12 that are arranged parallel, both in terms of connection and geometry. The precooled working fluid is passed by the refrigerant in the heat exchanger elements 14 in cocurrent, which and enters the heat exchanger elements 14 via refrigerant inlet 43. The precooled working fluid is cooled to 3° C. in the main heat exchanger section 12, in which the entrained moisture is largely condensed out. Cooled working fluid and condensate leave the main heat exchanger section 12 via connection profile 53 at condensate separator 40. The cooled and dried working fluid, which has a temperature of 4° C., is then passed to the heat exchanger elements 13 of the pre-heat exchanger section 11 via the connection profile 15. The refrigerant leaves the main heat exchanger section 12 via refrigerant outlet 44.

Figure 3:
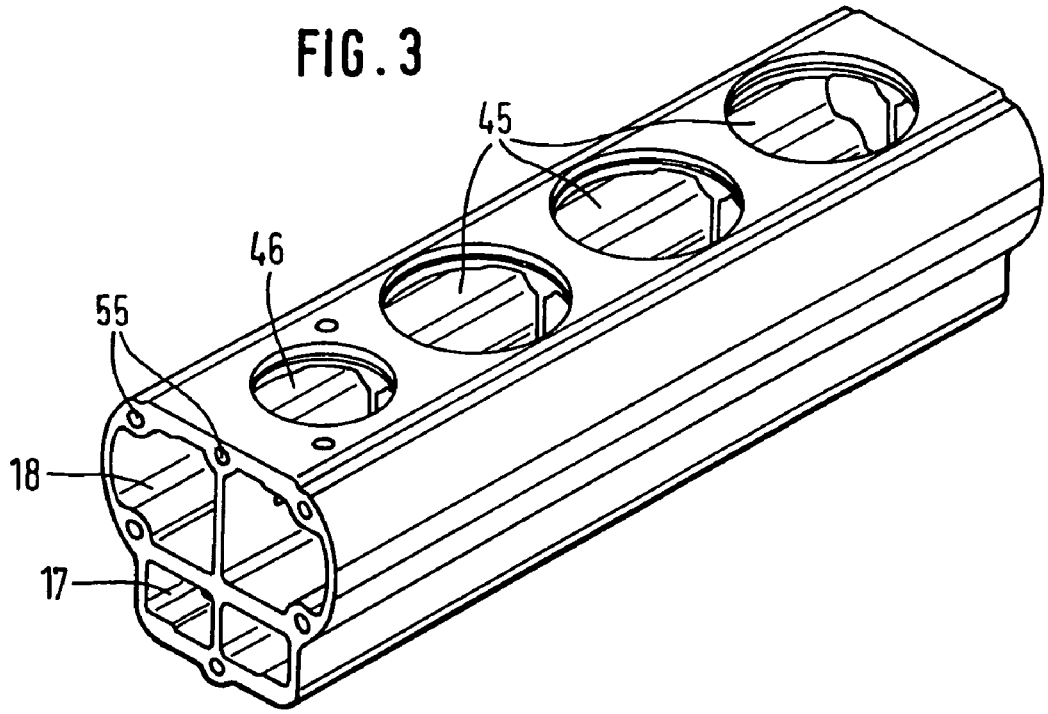
FIG. 3 shows a perspective view of a variant of a connection profile of a low-temperature dryer according to the invention.

FIG. 3 shows a variant of the connection profile of the low-temperature dryer in its perspective view. The connection profile is designed in one piece and comprises two fluid guide chambers 17, 18 to guide the working fluid and optionally the refrigerant.

The connection profile has several openings 45 on the side facing the heat exchanger elements 13, 14 for insertion or passage of heat exchanger elements 13, 14 and an opening 46 for connection of a fluid line (not shown in FIG. 3). Threaded holes 55 on the end of the connection profile serve to screw the connection profile to the end plate 54 and therefore seal it relative to the exterior. Holes 56 are provided for this purpose in end plate 54.

Figure 4:
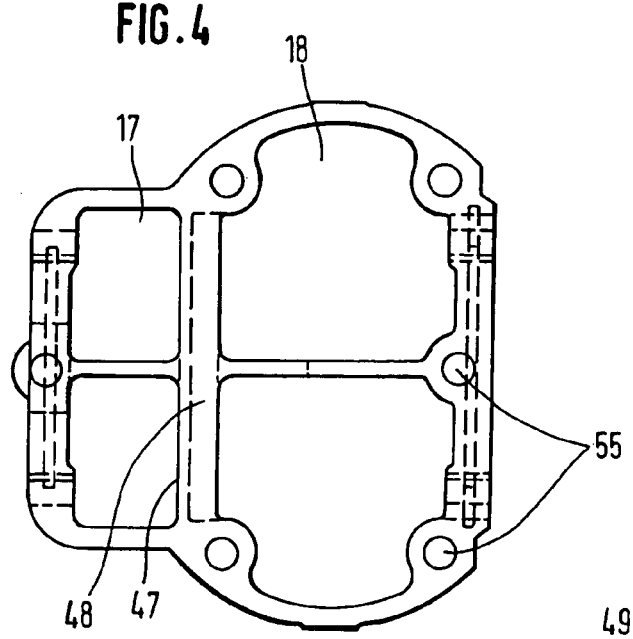
FIG. 4 shows a cross section of the connection profile according to FIG. 3.

The fluid guide chambers 17, 18 are separated from each other via partial 47 that has openings 48, in to which the heat exchanger elements 13, 14 can be inserted or positioned, and through which the bracing elements 19, 20 can be passed through in the form of rods (FIG. 4).

Figure 5:
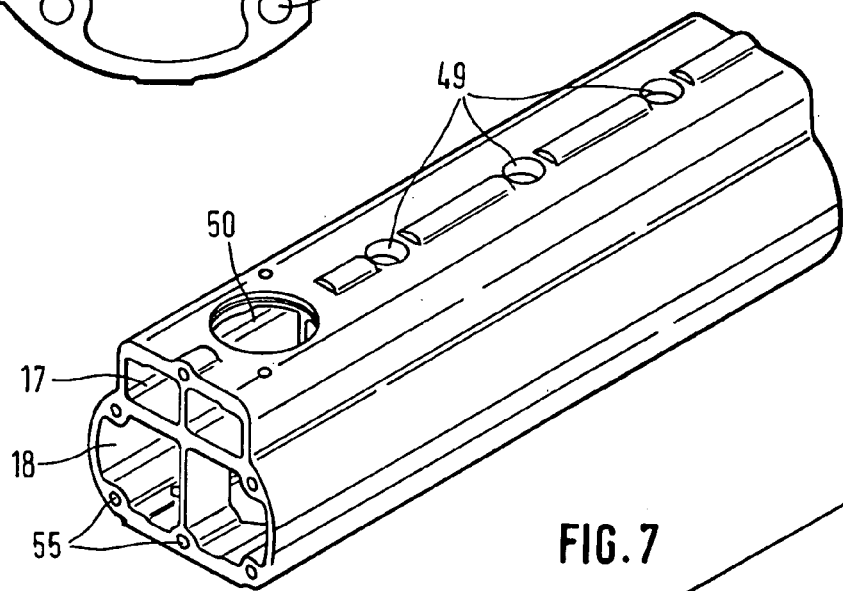
FIG. 5 shows a perspective view of the connection profile according to FIG. 3 to depict its side facing away from the heat exchanger element.

FIG. 5 shows a perspective view of the side of the connection profile according to FIG. 3 facing away from the heat exchanger elements 13, 14. The connection profile has several openings 49 on this side for passage of the bracing elements 19, 20 and an additional opening 50 for connection of a fluid line (not shown in FIG. 5). If the connection profile, for example, is flattened on one or both closed longitudinal sides, so that a rectangular cross section is produced, several such connection profiles can be arranged adjacent to each other in space-saving fashion on the closed longitudinal side. The fluid guide channels of the adjacent connection profiles can then be joined to each other through openings (not shown in FIG. 5).

Figure 6:
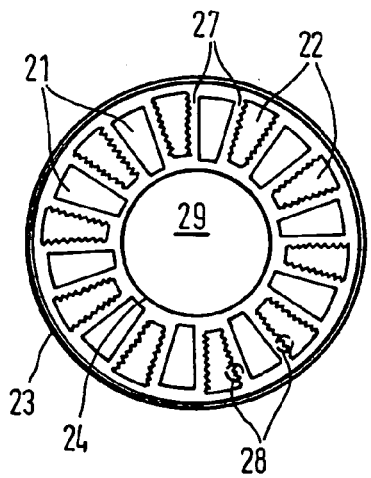
FIG. 6 shows a cross section of a variant of a heat exchanger element of the low-temperature dryer according to the invention.

FIG. 6 represents a cross section of a heat exchanger element of the low-temperature dryer according to the invention. Heat guide channels 21 and cold guide channels 22 are arranged adjacent to each other and alternating in the heat exchanger element and are separated from each other by partitions 27. The heat guide channels 21 and cold guide channels 22, arranged in alternation, form a closed ring around a central axis, in the present variant a central channel 29. Specifically, the alternating sequence of heat guide channels and cold guide channels defines a concentrically symmetric arrangement around the central axis or the central channel 29 of the circular heat exchanger element here. The closed ring of heat guide channels 21 and cold guide channels 22 has an outside 23 and an inside 24. For improved heat transfer through an increased heat exchanger surface, the cold guide channels 22 in the present variant are provided with ribs 28. For increased heat exchanger surface, the heat guide channels 21 exclusively or both fluid channels can be designed with profilings or ribs (not shown in FIG. 6).

The heat guide channels 21 are designed protruding in cross section to the inside 24 and the cold guide channels 22 are designed protruding to the outside 23 in cross section. In another variant, a reversed protruding arrangement of the heat guide channels 21 and cold guide channels 22 in cross section or an arrangement of the fluid channels at the same height in cross section is possible (not shown in FIG. 6).

Figure 7:
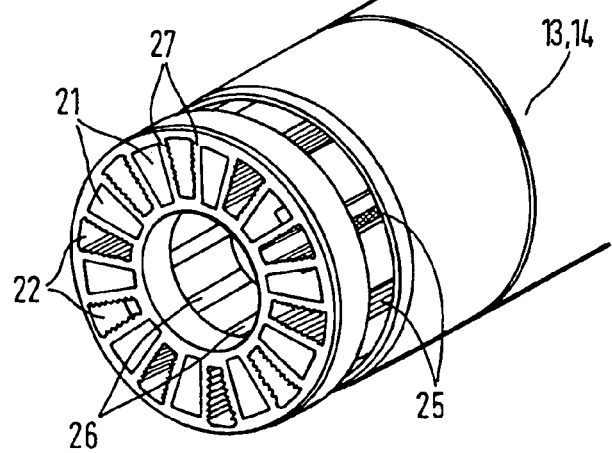
FIG. 7 shows a perspective view of the heat exchanger element according to FIG. 6.

By machining off the walls on the outside 23 and inside 24 of the elongated tube profile in areas, openings 25, 26 are formed, through which the working fluid and optionally the refrigerant can enter and leave the heat exchanger element 13, 14 (FIG. 7). The heat guide channels 21 in the present variant have openings 26 to the inside 24 of the heat exchanger element 13, 14 on the end. The cold guide channels 22 have openings 25 on the end to the outside 23 of the heat exchanger element 13. It is also possible that the cold guide channels 22 are opened to the inside 24 and the heat guide channels 21 to the outside 23 (not shown in FIG. 7), or that the openings of both channels lead to the same side, inside or out, but are arranged in different planes across the longitudinal extent of the heat exchanger elements 13, 14 (not shown in FIG. 7).

Figure 8:
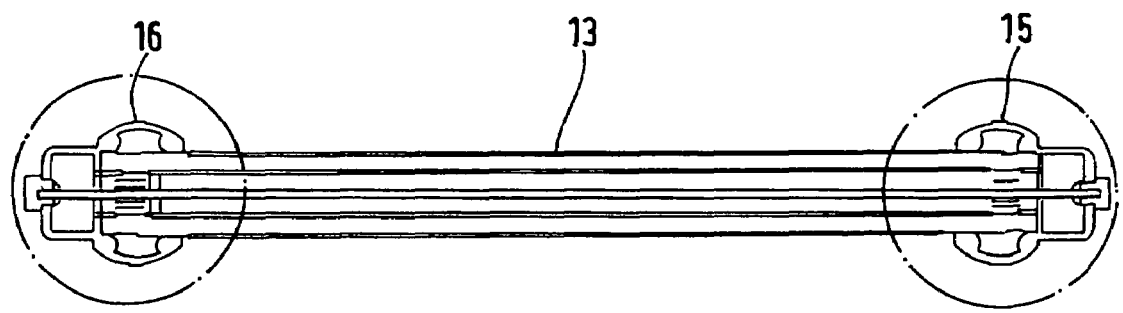
FIG. 8 shows a heat exchanger element according to FIG. 7, secured on both sides in the connection profile.
Figure 9:
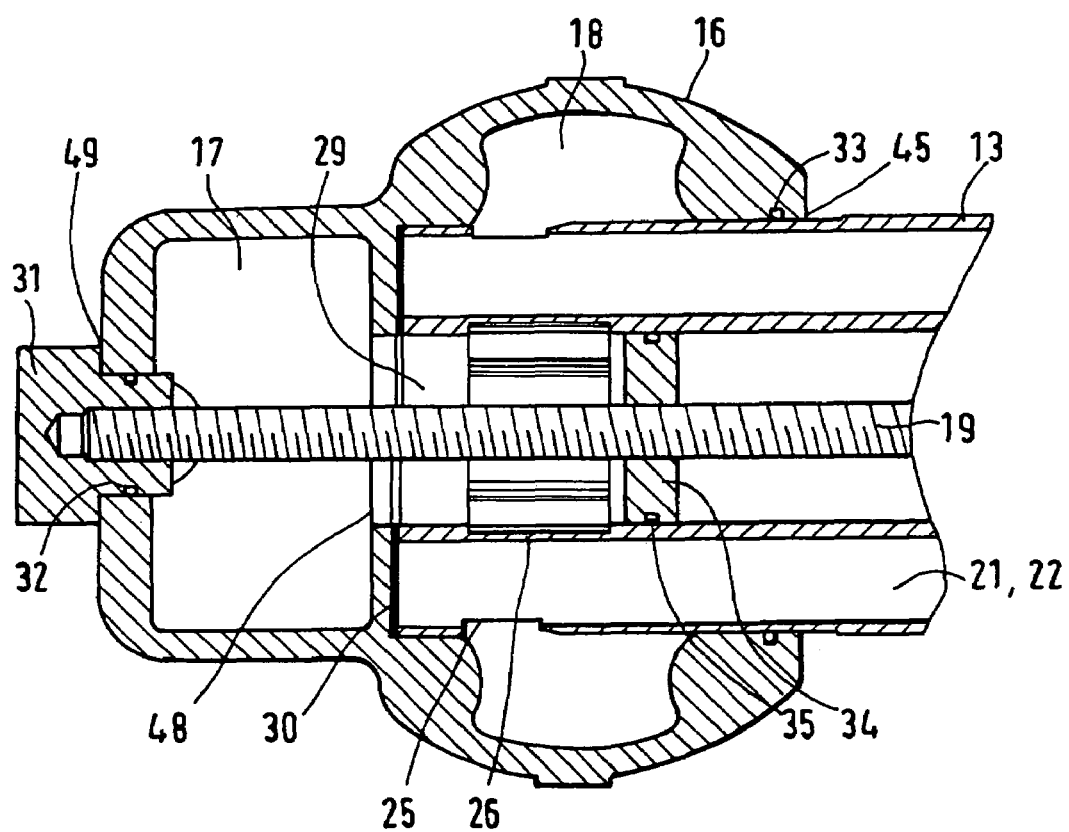
FIG. 9 shows a cross section of a connection site of the connection profile and heat exchanger element according to FIG. 8.
Figure 10:
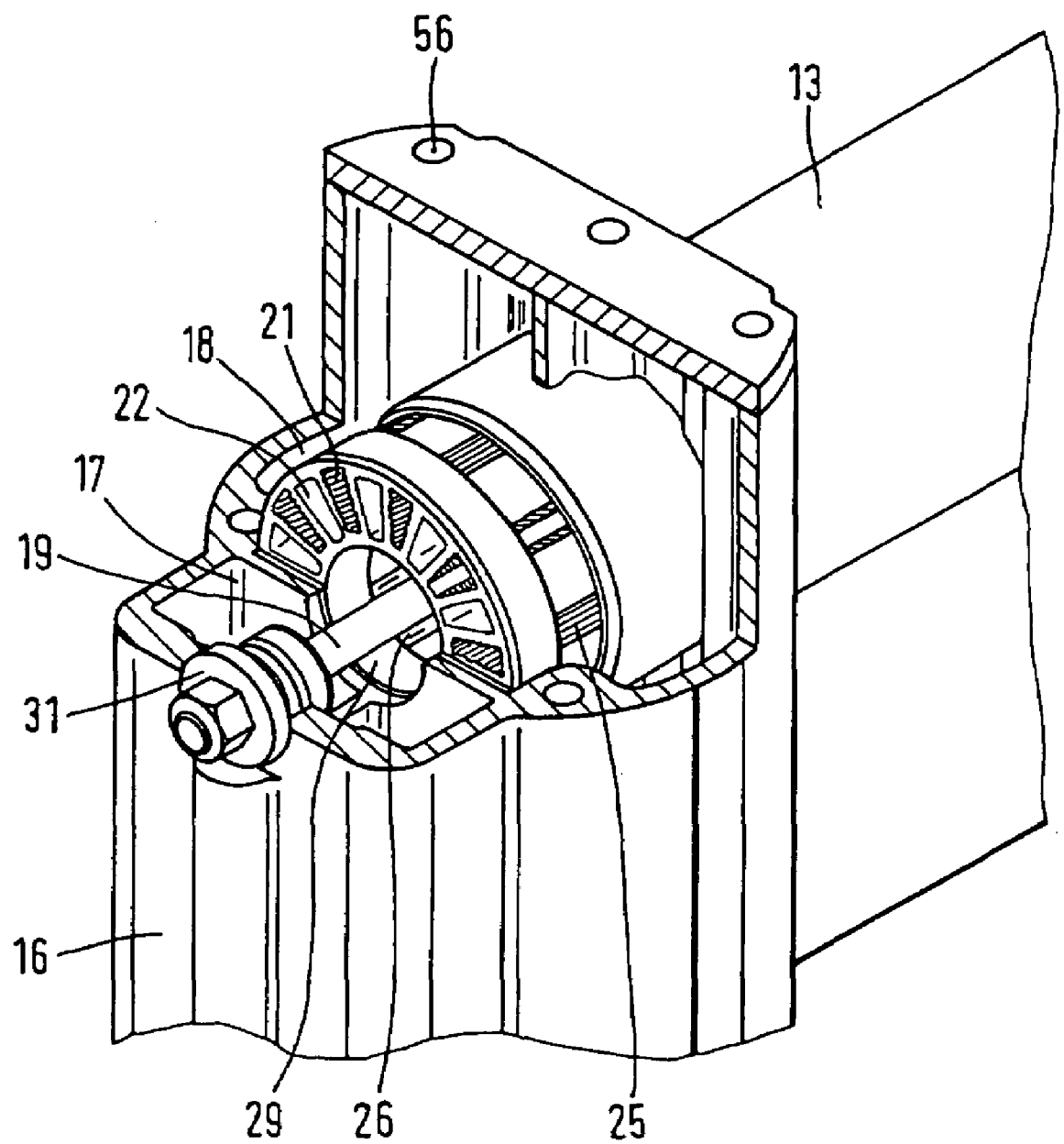
FIG. 10 shows a perspective view of the connection site of the connection profile and heat exchanger element according to FIG. 9.

The heat exchanger element 13 is secured and connected on both sides in the low-temperature dryer in connection profiles 15, 16 (FIG. 8). FIG. 9 shows the cross section of a connection side of the connection profile 16 with the heat exchanger element 13 according to FIG. 8. The heat exchanger element 13 is passed through the opening 43 in connection profile 16 and positioned at opening 48. The heat guide channels 21 and the cold guide channels 22 are sealed on the front of the heat exchanger element 13 relative to the fluid channel 7 with a seal 30. The central channel 29 is in fluid connection with the heat guide channels 21 or the cold guide channels 22 and is closed relative to the center of the tubular profile by an annular sealing element 34 with a sealing ring 35. The fluid is thus forced to flow from the central channel 29 through the provided heat guide channels 21 or cold guide channels 22. A sealing ring 33 in opening 45 of the connection profile 16 seals the fluid chamber 18 to the outside. The bracing element 19 passes through the annular sealing element 34, the central channel 29, the opening 48, the fluid chamber 17 and the opening 49, in which it is fastened to a clamping element 31. Another sealing ring 32 on clamping element 31 seals the fluid chamber 17 to the outside. The working fluid or optionally the refrigerant can flow in or out of the cold guide channels 22 or heat guide channels 21 through openings 25, 26 via fluid channel 18. The working fluid and optionally the refrigerant can enter or leave the heat guide channels 21 or cold guide channels 22 through openings 26, 25 via the fluid channel 17 and central channel 29. FIG. 10 shows the connection site of the connection profile 16 with the heat exchanger element 13 in a perspective view.

Figure 11:
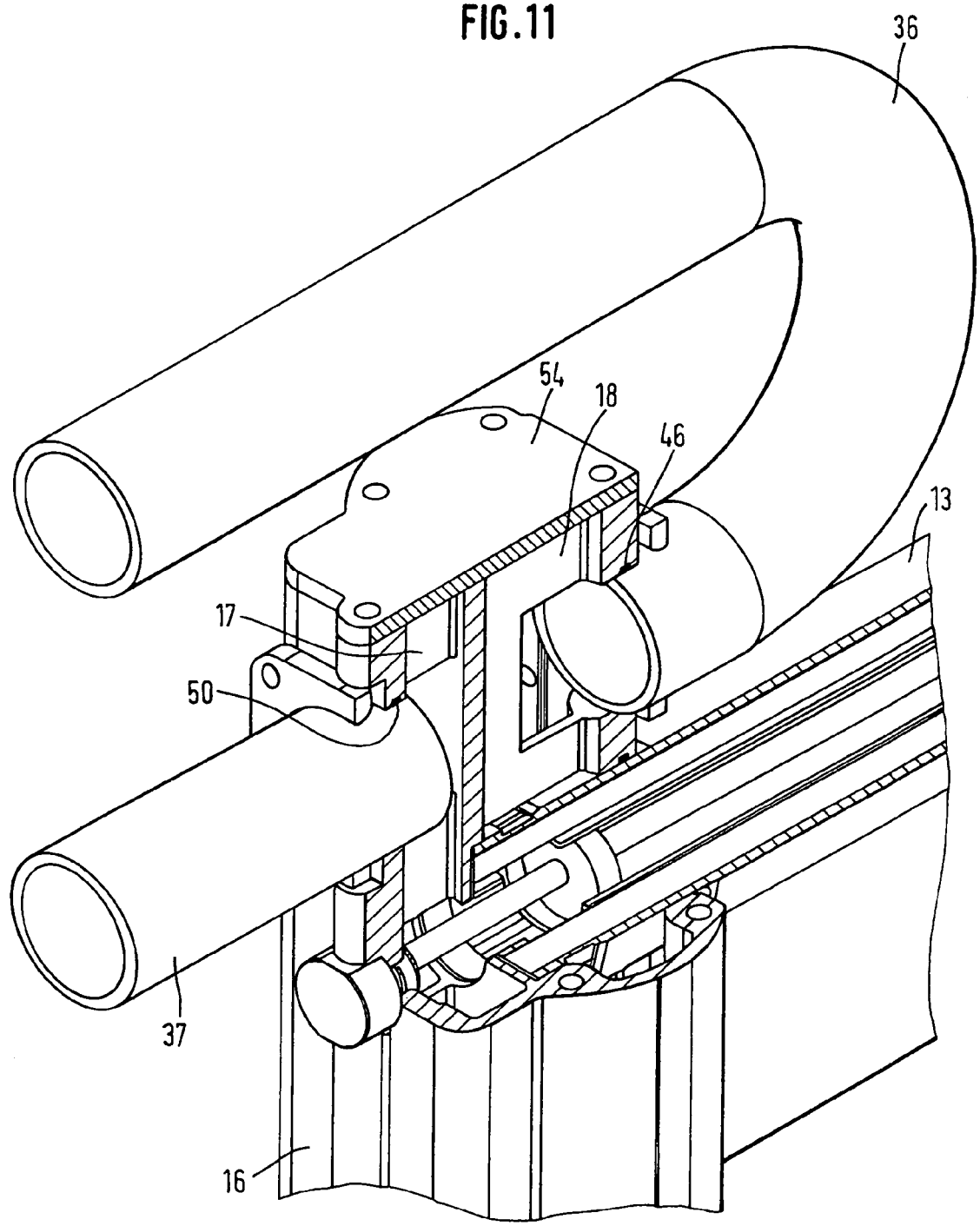
FIG. 11 shows a perspective view of a connection site of the connection profile and fluid line.

Feed and withdrawal of working fluid and optionally refrigerant to and from connection profile 16 occurs via fluid lines 36, 37 (FIG. 11). The fluid line 36 is accommodated in opening 46 of fluid chamber 18. Fluid line 37 is connected to fluid chamber 17 via opening 50.

Figure 12:
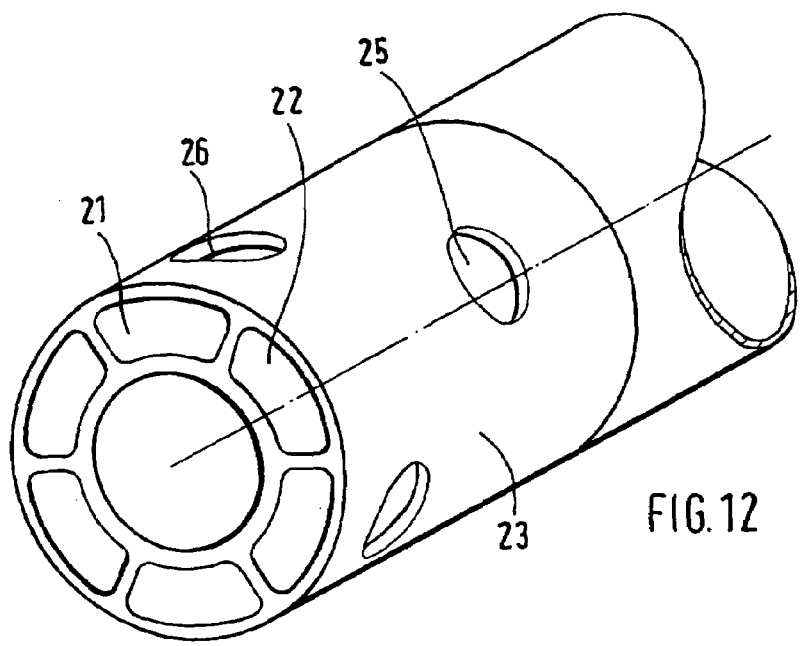
FIG. 12 shows a modified variant of the heat exchanger element.

In a modified variant of heat exchanger element 13, the openings 25, 26 of heat guide channels 21 and cold guide channels 22 can also be positioned together on one side of the heat exchanger element 13, for example, on the outside 23 (FIG. 12). The openings 25 are then arranged along the longitudinal axis of the heat exchanger element 13 in a different plane than the openings 26 and are made, for example, by introducing holes.

Figure 13:
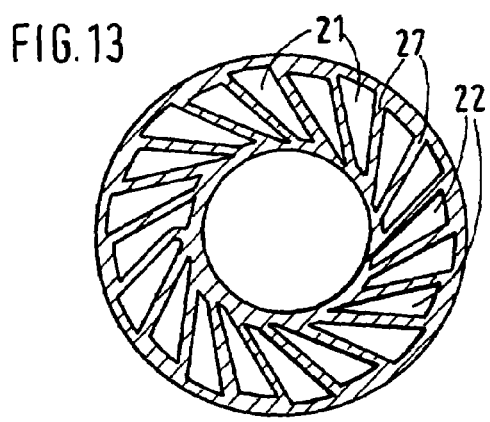
FIG. 13 shows a cross section of a heat exchanger element with sloped partitions.
Figure 14:
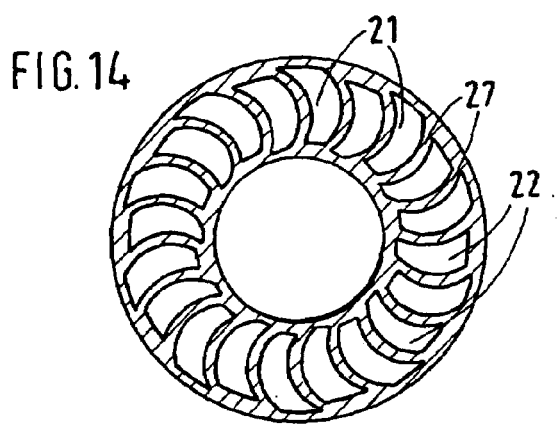
FIG. 14 shows a cross section of a heat exchanger element with curved partitions.
Figure 15:
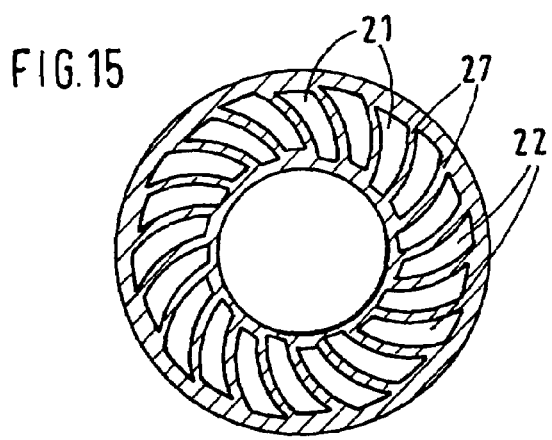
FIG. 15 shows a cross section of another heat exchanger element with curved partitions.
Figure 16:
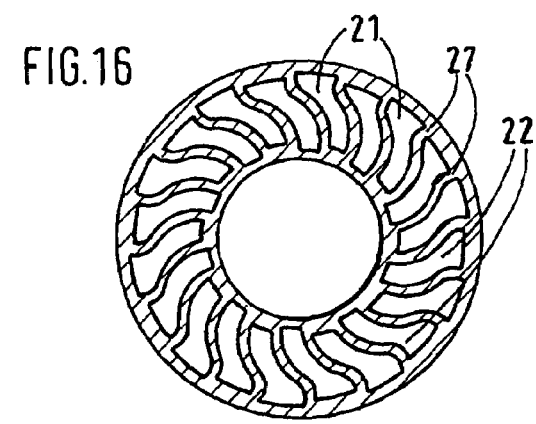
FIG. 16 shows a cross section of an additional heat exchanger element with curved partitions.
Figure 17:
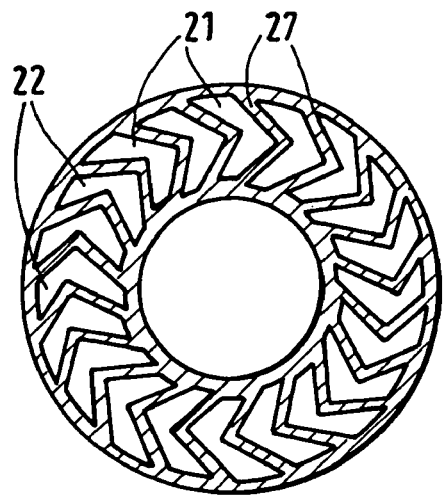
FIG. 17 shows a cross section of a heat exchanger element with bent partitions.

In another modified variant, the partitions 27 between the heat guide channels 21 and the cold guide channels 22 can also have a sloped trend (FIG. 13). Because of this, the surface available for heat transfer is increased, so that improved heat exchange can occur. In addition, turbulences or eddies in the flow profile can be produced by this variant of the heat exchanger elements, so that very effective heat transfer is achieved. If the heat guide channels 21 and the cold guide channels 22 are designed helical in profile in the axial direction (not shown in FIG. 13), the eddies occur in intensified form, so that the efficiency of heat transfer can be further increased. To increase the heat exchanger surfaces and to generation turbulization in the flow profile, the partitions 27 between the heat guide channels 21 and the cold guide channels 22 can also have a curved or bent trend (FIGS. 14 to 17). The more pronounced the curvature, the greater the surface usable for heat transfer. The intensity of curvature also affects the degree of turbulization. In the case of a doubly curved trend (FIG. 6) or a bent trend (FIG. 7), particularly strong turbulizations are generated for effective heat transfer. With a doubly curved trend of the partitions 27 (FIG. 16), very large heat transfer surfaces can also be produced.

Figure 18:
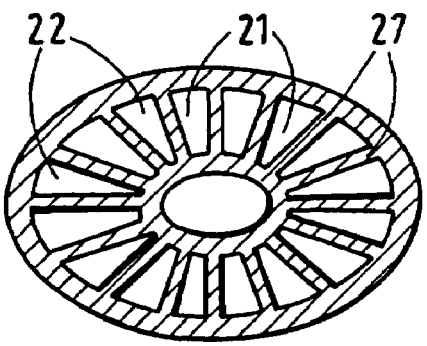
FIG. 18 shows a heat exchanger element with an oval cross section.
Figure 19:
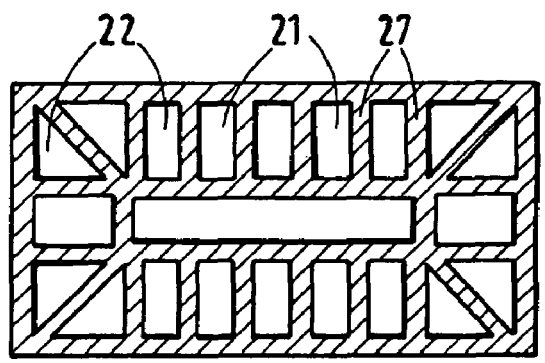
FIG. 19 shows a heat exchanger element with a rectangular cross section.
Figure 20:
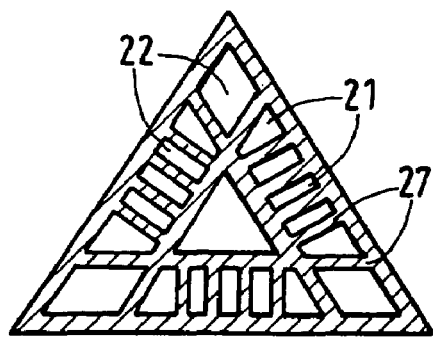
FIG. 20 shows a heat exchanger element with a triangular cross section.

It is also possible that the heat exchanger elements have an oval (FIG. 18), rectangular (FIG. 19) or triangular cross section (FIG. 20), in which the heat guide channels 21 and the cold guide channels 22 are arranged next to each other in alternation. The different cross sections permit optimal adjustment of the heat exchanger to different space conditions. In addition, depending on the variant of the partitions 27, very different flow profiles can be generated in the different cross sections, so that the heat exchanger can be adapted to a wide variety of requirements.

Figure 23:
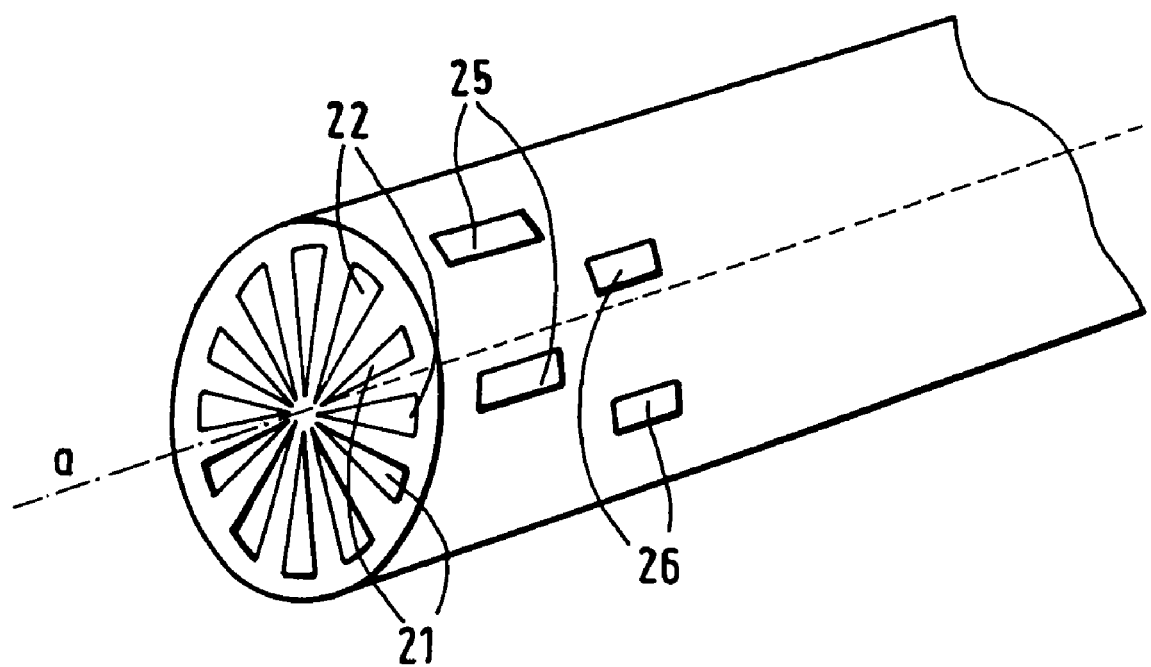
FIG. 23 shows another modified variant of a heat exchanger element.

In another variant of the heat exchanger elements, the heat guide channels 21 and the cold guide channels 22 are arranged in alternation in a closed ring around a central axis a (FIG. 23) that has an outside 23. The feed of working fluid and refrigerant can occur from the front of the heat exchanger element or from the outside 23. The heat guide channels 21 and cold guide channels 22 can be designed protruding in cross section. Openings 25, 26 can be made in different planes across the longitudinal extent of the heat exchanger elements by grinding or milling or by drilling.

Figure 21:
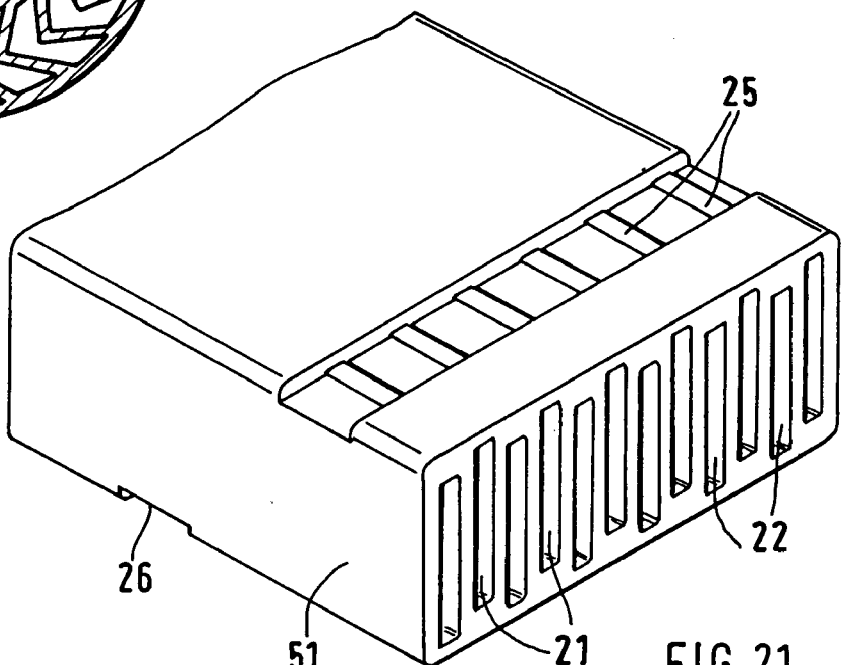
FIG. 21 shows another modified variant of a heat exchanger element.
Figure 22:
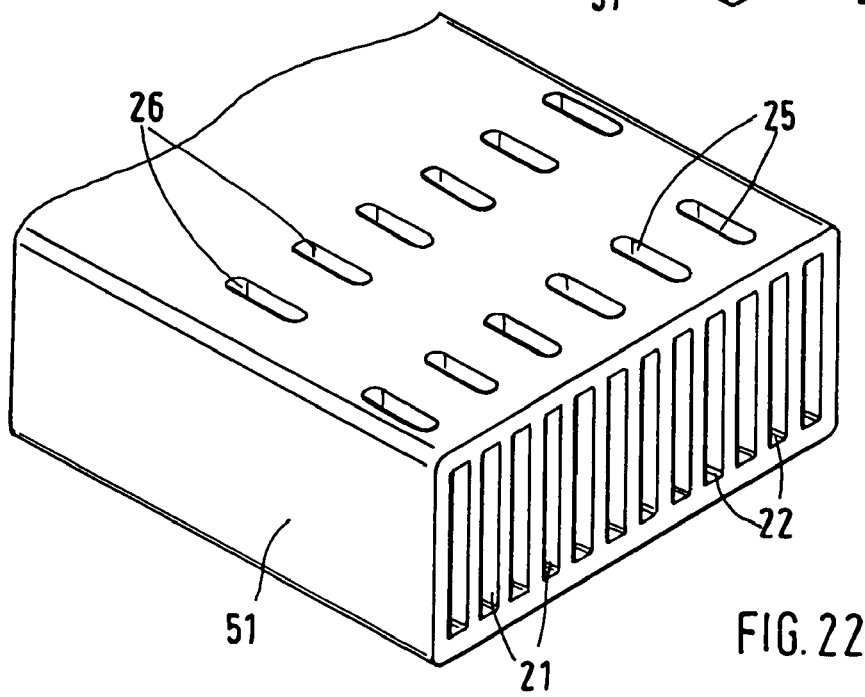
FIG. 22 shows another modified variant of a heat exchanger element according to FIG. 21.

A special variant of the heat exchanger elements is shown in FIG. 21. The rectangular heat guide channels 21 and cold guide channels 22 are arranged in alternation in a rectangular profile. Since the heat guide channels 22 [sic] and cold guide channels 22 are designed protruding in cross section upward and downward, openings 25, 26 can be made by grinding or milling the outside wall 51 in areas or by drilling. If the heat guide channels 21 and the cold guide channels 22 are not designed protruding in cross section, the openings 25, 26 can be produced by making holes in the outside wall 51 (FIG. 22).

Figure 24:
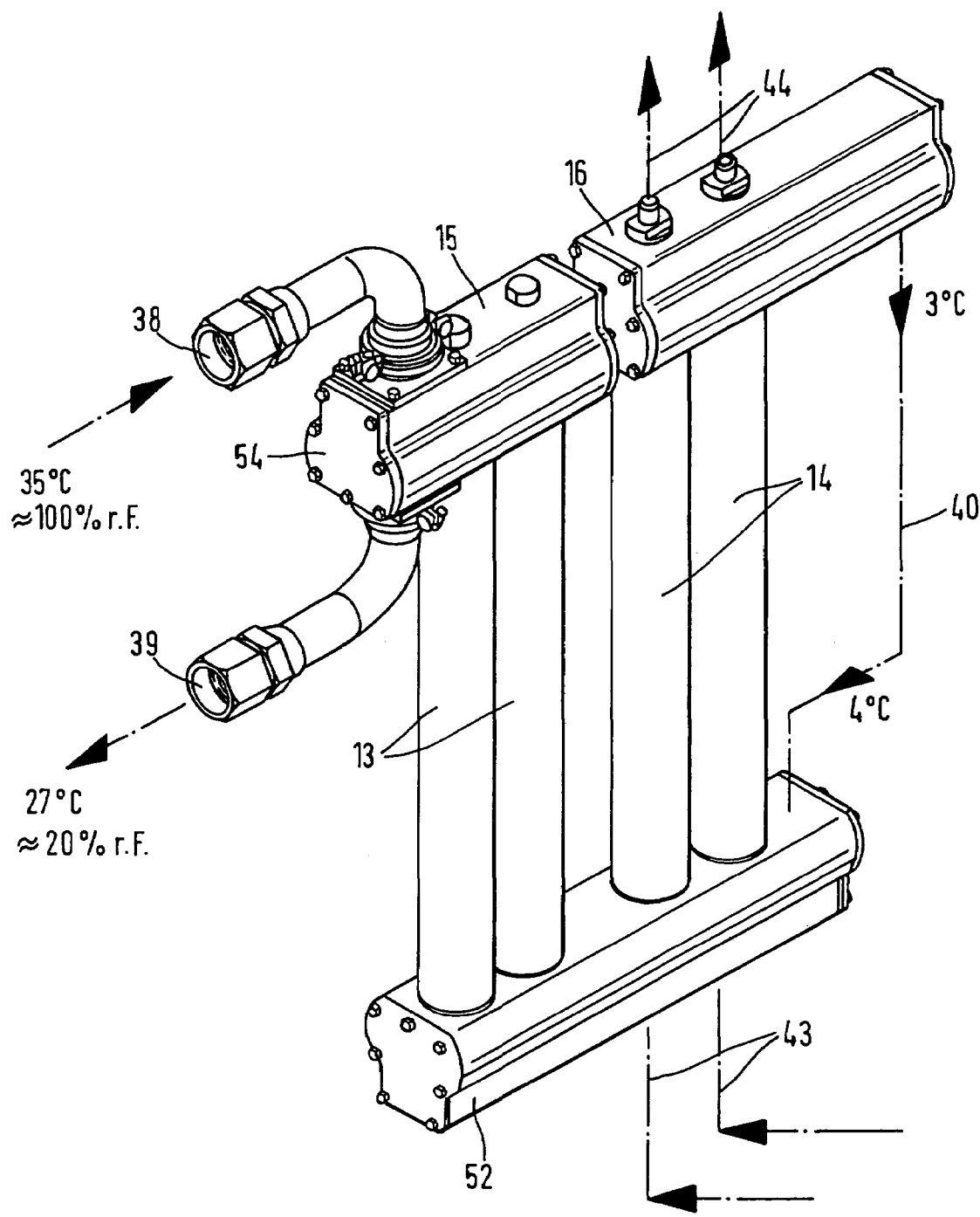
FIG. 24 shows another variant of a pre- and main heat exchanger section of a low-temperature dryer according to the invention.

FIG. 24 represents another variant of a pre-heat exchanger section 11 and a main heat exchanger section 12 of a low-temperature dryer according to the invention. The heat exchanger elements 13, 14 of the pre-heat exchanger section 11 and the main heat exchanger section 12 are arranged in the present variant parallel in a row. The heat exchanger elements 13, 14 are secured on one side on the end in a common one-piece connection profile 52. On the opposite side, the heat exchanger elements 13 of the pre-heat exchanger section 11 are secured on the end in connection profile 15 and the heat exchanger elements 14 of the main heat exchanger section 12 are secured on the end in connection profile 16. The connection profiles 15, 16, 52 are closed on the ends with end plates 54.

Feed and withdrawal of the uncooled or dried working fluid to or from the heat exchanger elements 13 and distribution of the uncooled working fluid to the heat exchanger elements 13 occur via connection profile 15 of the pre-heat exchanger section 11.

Feed and withdrawal of the precooled or dried working fluid to or from the heat exchanger elements 13, 14, as well as distribution of the precooled or dried working fluid to heat exchanger elements 13, 14, occur via the common connection profiles 52 of the pre-heat exchanger section 11 and the main heat exchanger sections 12.

Withdrawal of the cooled working fluid from the heat exchanger elements 14 occurs via the connection profile 16 of the main heat exchanger 12. In the present variant, the refrigerant is guided directly to the heat exchanger elements via the refrigerant inlet 43 directly and leaves it directly via refrigerant outlet 44. Refrigerant inlet 43 and refrigerant outlet 44 are arranged and traversed at right angles to the longitudinal axis of the connection profile 52.

The working fluid enters the pre-heat exchanger section 11 at the working fluid inlet 38 and is guided via connection profile 15 to the heat exchanger elements 13, arranged and connected parallel in the present variant. There it is passed by and cooled in countercurrent with the already cooled and dried working fluid. The already cooled and dried working fluid is then heated and leaves the pre-heat exchanger section 11 via connection profile 15 and working fluid outlet 39. The precooled working fluid from the pre-heat exchanger section 11 is now passed into the parallel arranged heat exchanger elements 14 of the main heat exchanger section 12 via the common connection profile 52. The precooled working fluid in the heat exchanger elements 14 is passed by the refrigerant in cocurrent and the refrigerant enters the heat exchanger elements 14 via the refrigerant inlet 43. The precooled working fluid is cooled in the main heat exchanger section 12, in which the entrained moistures is largely condensed. Cooled working fluid and condensate leave the main heat exchanger section 12 via the connection profile 16 to condensate separator 40. The cooled and dried working fluid is then sent via connection profile 52 to the parallel arranged heat exchanger elements 13 of the pre-heat exchanger section 11. The refrigerant leaves the main heat exchanger section 12 via refrigerant outlet 44.

The advantage of this variant of the pre-heat exchanger section 11 and the main heat exchanger section 12 is the space-saving arrangement, for very close space conditions, for a case in which only few parallel connected heat exchanger elements 13, 14 are required in the pre-heat exchanger section 11 and the main heat exchanger section 12.

The low-temperature dryer according to the invention, or the heat exchanger element according to the invention, achieves, according to the basic idea of the invention or in different preferred embodiments, the following advantages, in particular. A modular design of the overall arrangement with the possibility of simple capacity adjustment is achieved, because of the length and/or number of exchanger tubes. A few, partly identical components can also be used for different partial tasks. Components with several partial functions are bundled into integrated components (heat exchanger tube with heat guide channels and cold guide channels, in contrast to individual plates or profile sheets in finned coolers). A connection of the individual components is also possible releasably by simple connection techniques. In a particularly preferred variant, the two connection profiles and the two heat exchanger tubes each have the same profile cross section. Both the pre-heat exchanger section and the main heat exchanger section can be enclosed by a thermal accumulator mass or additional insulation.

The invention claimed is:

1. A low-temperature dryer, especially compressed air low-temperature dryer, for drying of a gaseous working fluid with cooling of a gaseous working fluid by use of a refrigerant, comprising: a pre-heat exchanger section and a main heat exchanger section, in which the pre-heat exchanger section and/or the main heat exchanger section comprises at least a preferably elongated heat exchanger element, in which cooling of the working fluid sent to the low-temperature dryer occurs in the pre-heat exchanger section from the dried and cooled working fluid in the countercurrent principle, in which additional cooling of the precooled working fluid introduced to the low-temperature dryer occurs in the main heat exchanger section from the refrigerant, so that moisture is condensed from the working fluid, in which all flow channels of the pre-heat exchanger section and/or the main heat exchanger section are designed essentially by hollow chamber profiles with a number of heat guide channels and cold guide channels, in which the at least one heat exchanger element of the pre-heat exchanger section and/or the main heat exchanger is secured and connected fluid-tight on the end in a connection profile, in which the heat exchanger element is designed as a preferably elongated tube profile and the heat guide channels and cold guide channels extend along the tube profile, and in which the heat guide channels and the cold guide channels are separated from each other by partitions (27) integrated along the tube profile.

2. The low-temperature dryer according to claim 1, wherein the heat guide channels and the cold guide channels are adjacent to each other, but arranged in alternation.

3. The low-temperature dryer according to claim 1, wherein the heat guide channels and/or the cold guide channels are opened across the longitudinal extent of the tubular profile on the end by openings (25, 26), so that inflow or outflow to or from the heat guide channels and/or cold guide channels occurs across the longitudinal extent of the tubular profile.

4. The low-temperature dryer according to claim 1, wherein the connection profile is designed essentially as a hollow chamber profile.

5. The low-temperature dryer according to claim 1, wherein the arrangement is formed from pre-heat exchanger section, main heat exchanger section and from connection profiles provided on the end of a total of at least four hollow chamber profiles.

6. The low-temperature dryer according to claim 5, wherein the at least four hollow chamber profiles are present in the form of two different types that differ in their profile cross sections.

7. The low-temperature dryer according to claim 1, wherein the connection profile is designed in one piece.

8. The low-temperature dryer according to claim 1, wherein the connection profile comprises at least one, preferably at least two, fluid guide chambers that are defined by the hollow chamber profile of the connection profile.

9. The low-temperature dryer according to claim 1, wherein the connection profile is designed for fluid-tight connection of a number of spaced heat exchanger elements.

10. The low-temperature dryer according to claim 1, wherein the heat exchanger elements of the pre-heat exchanger section and the main heat exchanger section are secured and connected fluid-tight in a common connection profile.

11. The low-temperature dryer according to claim 1, wherein the tube profile of the heat exchanger elements and/or connection profile is formed by extrusion.

12. The low-temperature dryer according to claim 11, wherein the profile has a circular cross section and is designed helical in the axial direction.

13. The low-temperature dryer according to claim 1, wherein the two connection profiles provided on the ends of the at least one heat exchanger element are clamped together via rigid bracing elements that are designed, in particular, as rods.

14. The low-temperature dryer according to claim 13, wherein the bracing elements, especially rods, are passed at least partially through the heat exchanger elements.

15. The low-temperature dryer according to claim 1, wherein the at least one elongated heat exchanger element is secured on its ends in the connection profiles, so that the preferred directions of the connection profiles run parallel to each other and the heat exchanger elements are aligned essentially orthogonal to it.

16. The low-temperature dryer according to claim 1, wherein the connection profiles are formed from the same base material as the heat exchanger elements.

17. The low-temperature dryer according to claim 16, wherein the openings of the heat guide channels and/or the openings of the cold guide channels lie on the tube profile essentially in one plane on the end.

18. The low-temperature dryer according to claim 16, wherein the base material is aluminum.

19. The low-temperature dryer according to claim 1, wherein the outside walls of the heat guide channels or the cold guide channels are designed protruding relative to the outside walls of the cold guide channels or the heat guide channels at least on the outside or inside in cross section, and that the heat exchanger element has a circular cross section and the openings in the heat guide channels or cold guide channels arranged protruding in cross section are introduced by material removal in areas, especially machining.

20. The low-temperature dryer according to claim 1, wherein the partitions between heat guide channels and cold guide channels are provided with profilings, especially ribs, at least on one side, advantageously on both sides, to increase the heat exchanger surface.

21. The low-temperature dryer according to claim 1, wherein the heat guide channels and the cold guide channels are arranged around a central channel—that runs along the heat exchanger element.

22. The low-temperature dryer according to claim 21, wherein the central channel is in fluid connection on the end with the heat guide channels or the cold guide channels via openings and is closed to the center of the tubular profile by a sealing element.

23. The low-temperature dryer according to claim 1, wherein the heat exchanger element has at least one heat guide channel or cold guide channel and, at the same time, at least two, preferably more, cold guide channels or heat guide channels.

24. The low-temperature dryer according to claim 1, wherein the heat guide channels and/or the cold guide channels have an essentially circular segment-like cross section.

25. The low-temperature dryer according to claim 1, wherein the partitions have a curved or bent trend to increase the heat exchanger surface.

26. The low-temperature dryer according to claim 25, wherein the partitions have a spiral arm-like trend in cross section relative to the longitudinal extent of the heat exchanger element.

27. A heat exchanger element for a liquid or gaseous media, especially for use in a low-temperature dryer according to claim 1, in which the heat exchanger element is designed as a preferably elongated tubular profile and comprises several heat guide channels and cold guide channels extending along the tube profile, in which the heat guide channels and the cold guide channels are arranged adjacent to each other, but in alternation, in which the heat guide channels and the cold guide channels are separated from each other by partitions integrated with the tube profile, wherein the outside walls of the heat guide channels or the cold guide channels are designed protruding in cross section relative to the outside walls of the cold guide channels or the heat guide channels at least on the outside or inside.

28. A heat exchanger element for a liquid or gaseous media, especially for use in a low-temperature dryer according to claim 1, in which the heat exchanger element is designed as a preferably elongated tube profile and comprises several heat guide channels and cold guide channels extending along the tube profile, in which the heat guide channels and the cold guide channels are arranged adjacent to each other, but in alternation, in which the heat guide channels and the cold guide channels are separated from each other by partitions integrated with the tube profile, wherein the heat guide channels and the cold guide channels are opened on the end across the longitudinal extent of the tube profile by openings, so that inflow or outflow into or from the heat guide channels and cold guide channels occurs across the longitudinal extent of the tube profile, in which the openings of the heat guide channels are also arranged offset relative to openings of the cold guide channels in the longitudinal extent of the tube profile.

* * * * *